United States Patent [19]
Billado

[11] Patent Number: 6,009,697
[45] Date of Patent: Jan. 4, 2000

[54] SELF-CLEANING RAKE

[76] Inventor: Harry S. Billado, 249 Islington St., Apt. #4, Portsmouth, N.H. 03801

[21] Appl. No.: 08/912,078

[22] Filed: Aug. 15, 1997

Related U.S. Application Data

[60] Provisional application No. 60/026,087, Aug. 21, 1996.

[51] Int. Cl.$^7$ ....................................................... A01D 7/10
[52] U.S. Cl. ..................................... 56/400.08; 56/400.17
[58] Field of Search ........................... 56/400.08, 400.01, 56/400.07, 400.09, 400.1, 400.14, 400.17, 400.21

[56] References Cited

U.S. PATENT DOCUMENTS

| | | | |
|---|---|---|---|
| 3,364,668 | 1/1968 | Scavetto | 56/400.17 |
| 3,901,010 | 8/1975 | Pajunen | 56/400.08 |
| 5,161,360 | 11/1992 | Hill | 56/400.17 |
| 5,431,001 | 7/1995 | Large | 56/400.21 |

Primary Examiner—Robert E. Pezzuto

[57] ABSTRACT

A hand held garden implement, namely a rake, which allows for self-cleaning through the new design of the rakes prongs or teeth of collected leaves, grass, vegetable matter or other adhering material. The head of the rake, containing a plurality of interconnected prongs or teeth, moves as a unit. The first prong or tooth has a first leg that extends from a first tine, and a second leg that extends from a second, adjacent tine. The two legs meet and are joined at a rounded point midway between the two tines and forms a triangular shape. The next prong or tooth has a first leg that extends from the second tine and meets a second leg extending from a third adjacent tine. Each prong or tooth is substantially perpendicular to the tines. Between each prong or tooth, at the point where each leg meets a tine is a 2–2.5 inch slot cut vertically up each tine to allow each prong or tooth the ability to work independently of each other. This order of the first two prongs or teeth continue until the desired rake width is met. The existence of the prongs or teeth between the tines will enable the rake head to remain clear of debris without any additional movements by the operator.

5 Claims, 4 Drawing Sheets

SELF-CLEANING RAKE

This application claim benefit of provisional appln. 60/026,089 filed Aug. 21, 1996.

FIELD OF INVENTION

This invention relates to plastic, metal, and bamboo lawn and leaf rakes, and more particularly to a rake that cleans itself of leaves, grass and other vegetable matter.

BACKGROUND OF THE INVENTION

One of the more frustrating jobs associated with leaf or grass raking is the need to periodically bend down (or to reverse the orientation of the rake and bring up its head) and reach for the rake head in order to manually clean away material which adheres to the rake tines in the areas between the prongs. This has to be done very often—perhaps after only one or two strokes in the case of certain types of leaves or vegetable garden matter, or when the matter is wet. Repeated stooping is fatiguing and may even be harmful to the back, particularly in the case of elderly gardeners. Bringing the rake head up is also unsatisfactory as it disrupts the normal flow and repetition of the rake strokes.

Much effort, apparently unsuccessful as measured by the lack of known commercialization, has therefore been directed toward developing a rake which is "self-cleaning;" which is to say, one which may be cleaned without the operator either having to stoop down or having to bring the rake head up.

Prior developments in this field will be generally illustrated by reference to the following U.S. Pat. Nos.:

| U.S. Pat. No. | Patentee | Issue Date |
| --- | --- | --- |
| 3,901,010 | Pajunen | 02/08/74 |
| 4,573,311 | Ipema et al. | 10/14/84 |
| 4,744,208 | King | 12/24/86 |
| 4,850,185 | Dimon | 06/25/89 |

The above patents teach self-cleaning rakes all imply similar "self-cleaning" methods using attachments and other additions to the rake tines,prongs or teeth to clean them. None show means of cleaning without additions to the design of the rake prongs or teeth themselves.

SUMMARY OF INVENTION

The present invention is a hand held garden implement, namely a rake, which allows for self cleaning through the new design of the rakes prongs or teeth of collected leaves, grass, vegetable matter or other adhering materials. Unlike the prior art, the head of the rake, containing a plurality of interconnected prongs or teeth, moves as a unit with respect to the handle without using any additional cumbersome attachments. This design will enable the tines and prongs or teeth to remain clear of debris without any additional movements by the operator; thus the task of raking becomes fluent and without interruption.

In particular, the rake of the present invention includes a handle and a head attached to said handle. The head includes a plurality of tines with at least one tooth connected between adjacent ones of said tines for preventing debris from traveling between the tines. In a preferred embodiment, the teeth are triangular such that each tooth is comprised of a pair of legs which extend from adjacent tines to meet at a point substantially midway between adjacent tines. Each of said legs is preferably about 2.5 inches in length.

In an alternative embodiment, one or more teeth may be formed from a unitary curved member extending between adjacent ones of said tines. Other geometric shapes for the teeth are also contemplated. The teeth may be positioned with respect to the tines at a variety of angles depending on the length of the handle and the dimensions of the head. Preferably, however, each tooth extends substantially perpendicular to said tines. In another embodiment the head includes a plurality of adjacent pairs of tines with at least one connected between each of said adjacent pairs of tines.

OBJECTS OF THE INVENTION

An object of this invention is to provide improved means for cleaning lawn and garden rakes. Accordingly, an interconnected prongs or teeth rake head is disclosed.

Another object is to provide a means for the rake head to remain clear of debris without attachments that would require the operator to produce additional movements beyond the objective of raking leaves, grass, or vegetable matter.

Yet another object is not to require the operator to stoop forward or to bring the rake head up within reach to remove adhered material.

Still another object of the invention is to provide an improved rake which prevents collection of debris between tines of the rake head.

Still another object of the invention is to provide an improved rake which prevents collection of debris between tines of the rake head and which is of simple and cost efficient design.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

For a better understanding of the present invention, together with other objects, features and advantages, reference should be made to the following description of the preferred embodiment which should be read in conjunction with the following figures wherein like numerals represent like parts.

DESCRIPTION OF THE PREFERRED EMBODIMENT

Figure 1:
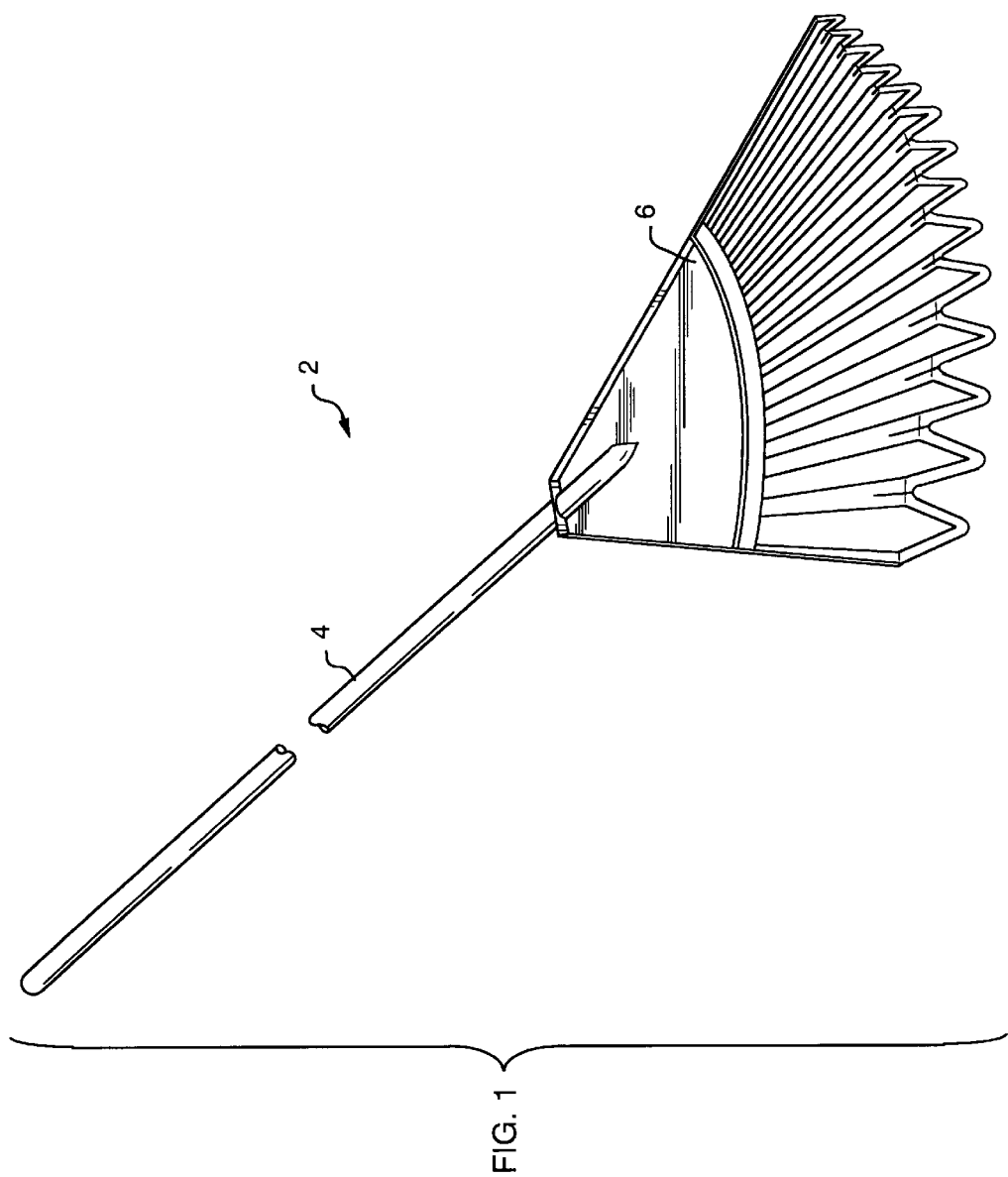
FIG. 1 is a fragmentary sectional perspective view of a preferred embodiment of the rake of my invention in one position.

Referring to FIG. 1 there is illustrated therein a self-cleaning rake of my invention, generally designated 2. Rake 2 comprises elongated cylindrical handle 4, typically, the handle 4 is of convenient length for raking leaves etc; ie about 4 feet, and is constructed using convention injection mold or metal fabrication techniques from plastic, sheet metal or the like; although other materials will suffice. The handle 4 terminates in a head 6.

Figure 2:
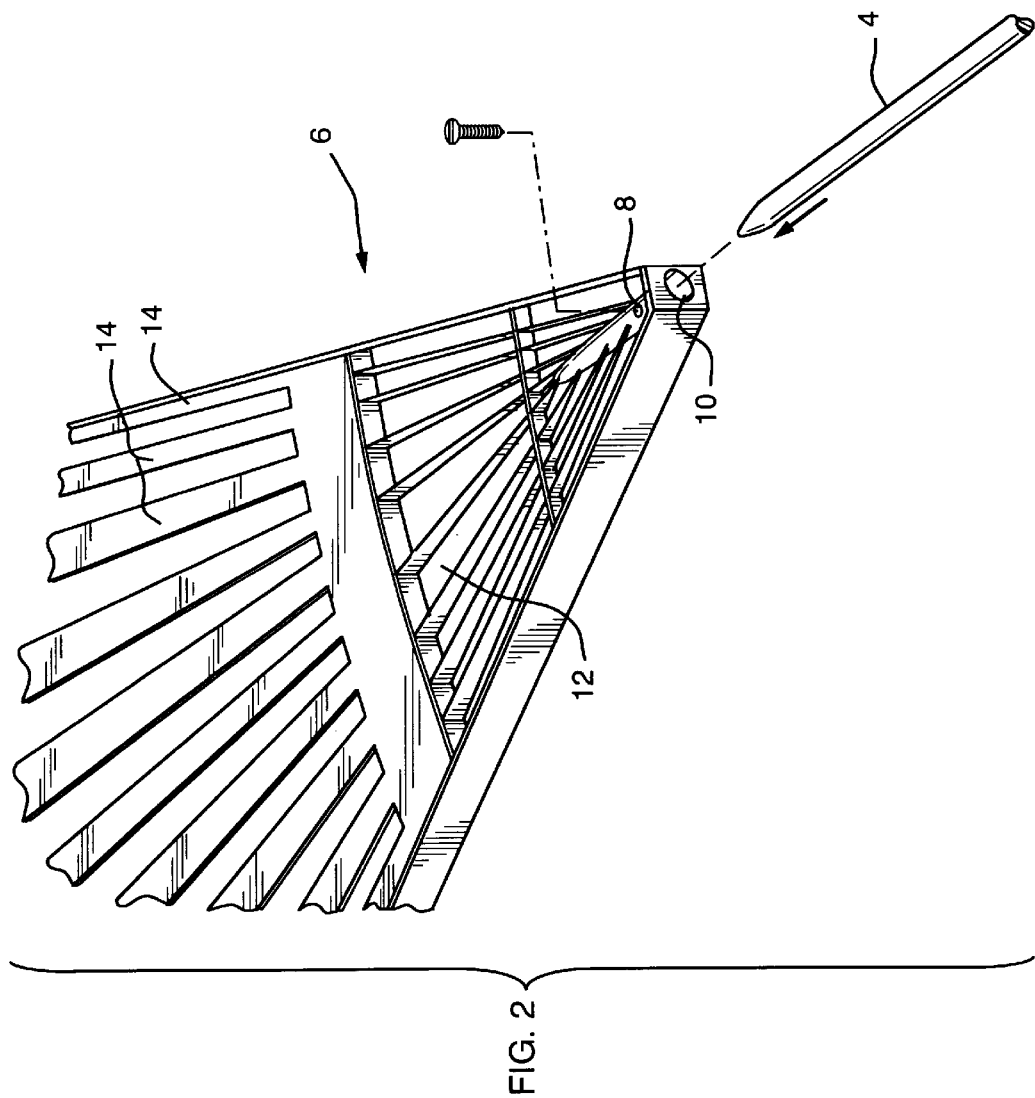
FIG. 2 is a fragmentary sectional view of the tines, body and means in which the handle is fastened to the rake head.

Referring to FIG. 2 the head 6 is fastened to the handle 4 by known means and preferably by a screw or the like, at a slot or opening 8 through the origin of the head 10. Head 6 includes a body 12 with downwardly extending tines 14. The body 12 and tines 14 are preferably made of the same material; ie plastic as is common.

Figure 3:
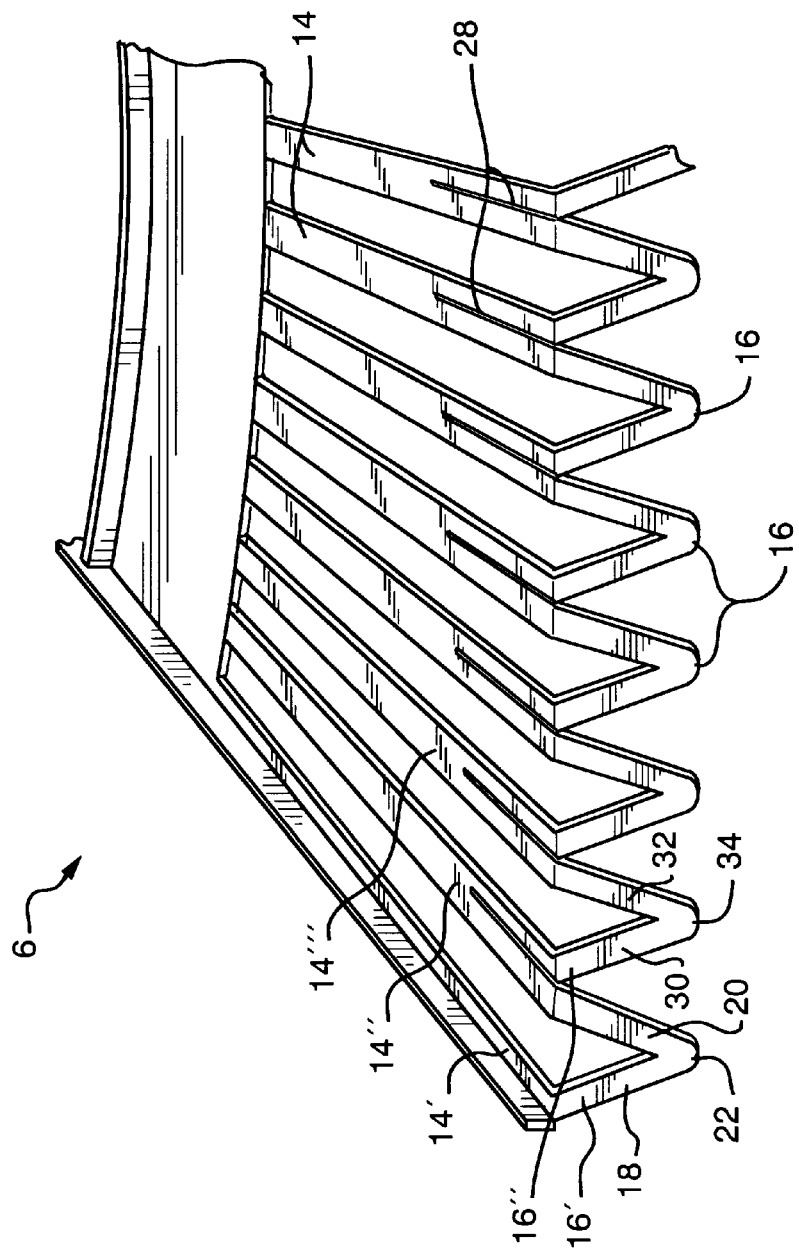
FIG. 3 is a fragmentary sectional view of the tines and prong or teeth of a preferred embodiment of the rake of my invention.

Referring to FIG. 3 tines 14 terminate in leaf grasping prongs or teeth 16. The prongs or teeth 16 are substantially perpendicular to the tines 14, however degrees other than 90 are possible. In particular, the length of the handle or dimensions of the head may require that the teeth be positioned at angles other than 90 degrees to provide contact of the teeth with the surface to be cleaned/raked. The prongs or teeth 16 are made of the same flexible molded plastic as is the head 6. The first of the prongs or teeth 16' has a first leg 18 which extends from a first tine 14' and a second leg 20 which extends from an adjacent tine 14". The legs 18, 20 meet and are joined at a rounded point 22 substantially midway between the two tines 14', 14". The next prong or tooth 16" has a first leg 30 which extends from the second tine 14" and a second leg 32 which extends from an adjacent tine 14'". The legs 30, 32 meet and are joined at a rounded point 34 substantially midway between the two tines 14", 14'". Between each prong or tooth at the point that each leg meets at a tine about a 2 inch slot is cut up each tine 28 to enable each prong or tooth to work independently from each other. The length of this slot however can vary, and the slot itself could be withdrawn and the design and function of the invention would not change. This order of prongs or teeth continue in the same fashion as the first two prongs or teeth 16', 16" until the desired width of 32 inches or any desired width is met to enable the task of raking leaves or the like. In the preferred embodiment, each tine leg (e.g. 18, 20) is about 2.5 inches in length for a 32 inch rake. This length however can very depending on the size rake being used.

Figure 4A:
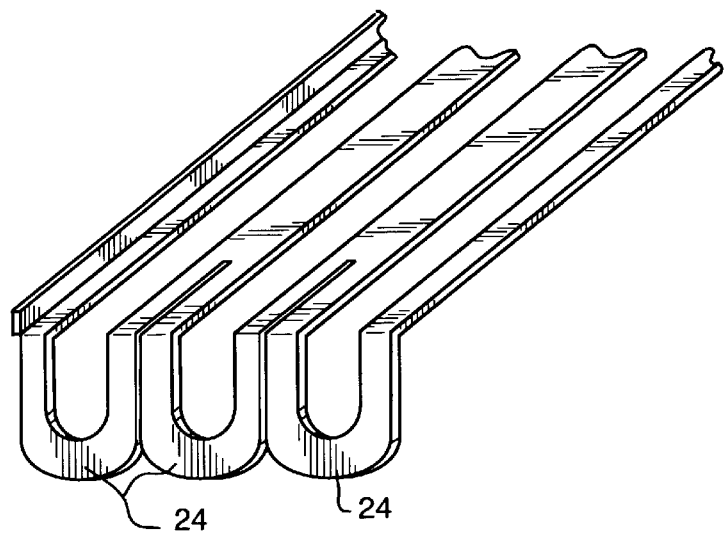
FIG. 4 is a fragmentary sectional view of the variations in the size and shapes of the teeth that are possible.
Figure 4B:
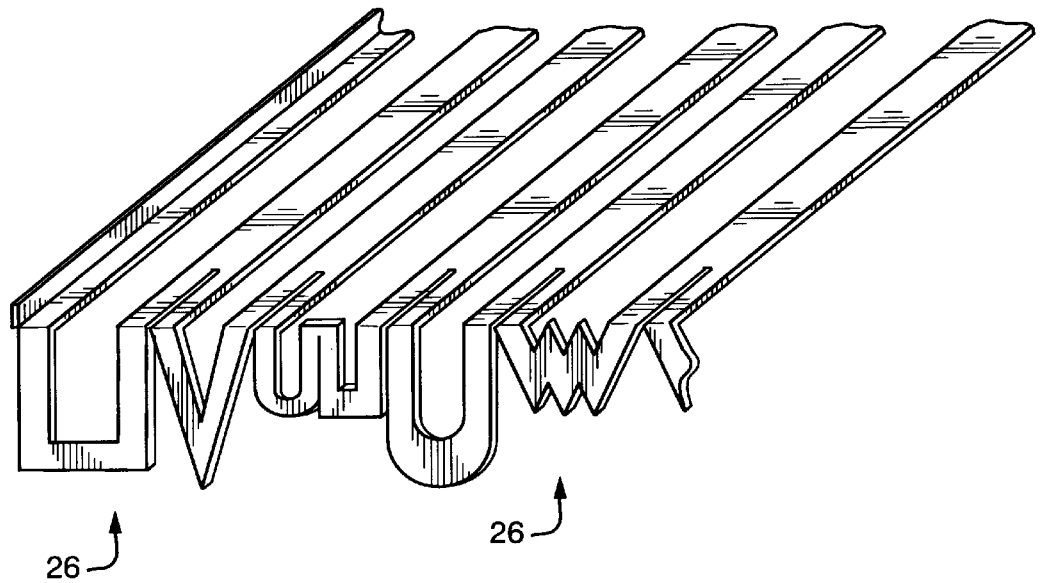

Referring now to FIG. 4 a rake according to the present invention may have curved or arced teeth with the same results. The curved or arced teeth comprise a unity curved member 24 extending between the adjacent tines. Other variations in the size and shape of the teeth are also possible. For example, the teeth may be square or multiple teeth may exist between two adjacent tines. In addition, combinations of various shaped and sized teeth may be used in the same rake 26.

The existence of the prongs or teeth between the tines eliminates the troublesome debris that gathers and subsequently binds between ordinary, common tines that terminate into ordinary, common prongs or teeth. This is because of the triangular shape of the prongs or teeth and the interlocking of each prong or tooth to the next that does not allow for a route of travel for the accumulating debris.

While the above provides a full and complete disclosure of the preferred embodiments of this invention, various modifications, alternate constructions, and equivalents may be employed without departing from the true spirit and scope of the invention. Therefore, the above description and illustrations should not be construed as limiting the scope of the invention which is defined by the appended claims.

What is claimed is:

1. A rake for removing debris from a surface, said rake comprising:

a handle;

a head attached to said handle, said head comprising a plurality of tines and a plurality of teeth adapted to contact said surface for removing said debris therefrom, wherein each of said tines is interconnected to each of said tines adjacent thereto by one of said teeth, said teeth thereby preventing debris from traveling between adjacent ones of said tines as said teeth are moved over said surface.

2. A rake according to claim 1, wherein said at least one tooth is triangular such that said tooth is comprised of a pair of legs which extend from adjacent tines to meet at a point substantially midway between said adjacent tines.

3. A rake according to claim 2, wherein each of said legs is about 2.5 inches in length.

4. A rake according to claim 1 wherein said at least one tooth is formed from a unity curved member extending between adjacent ones of said tines.

5. A rake according to claim 1, wherein said at least one tooth extends substantially perpendicular to said tines.

* * * * *